(12) United States Patent
Neuhauser

(10) Patent No.: US 6,704,136 B2
(45) Date of Patent: Mar. 9, 2004

(54) PUMPING SOURCE HAVING A PLURALITY OF REGULATED PUMP LASERS FOR BROADBAND OPTICAL AMPLIFICATION OF WDM SIGNAL

(75) Inventor: Richard Neuhauser, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 62 days.

(21) Appl. No.: 10/052,198

(22) Filed: Jan. 16, 2002

(65) Prior Publication Data

US 2002/0114065 A1 Aug. 22, 2002

(30) Foreign Application Priority Data

Jan. 16, 2001 (DE) .......................................... 101 01 742

(51) Int. Cl.⁷ ................................................ H01S 3/00
(52) U.S. Cl. .................................. 359/334; 359/341.33
(58) Field of Search .............................. 359/334, 341.3, 359/341.31, 341.32, 341.33

(56) References Cited

U.S. PATENT DOCUMENTS

| | | | | |
|---|---|---|---|---|
| 5,173,957 A | * | 12/1992 | Bergano et al. ................ 385/24 |
| 5,479,423 A | | 12/1995 | Tanikawa ...................... 372/26 |
| 6,236,777 B1 | * | 5/2001 | Ravasio et al. ................ 385/24 |
| 6,246,510 B1 | * | 6/2001 | BuAbbud et al. ............ 359/337 |
| 6,307,670 B1 | * | 10/2001 | McNamara ............. 359/341.33 |
| 6,426,833 B1 | * | 7/2002 | Bao ....................... 359/341.32 |
| 6,441,950 B1 | * | 8/2002 | Chen et al. ................... 359/334 |
| 6,441,954 B1 | * | 8/2002 | Yadlowsky ............. 359/341.31 |
| 6,452,715 B1 | * | 9/2002 | Friedrich ..................... 359/334 |
| 6,542,287 B1 | * | 4/2003 | Ye et al. ...................... 359/334 |
| 2001/0050802 A1 | * | 12/2001 | Namiki et al. .......... 359/337.11 |
| 2002/0085268 A1 | * | 7/2002 | Zarris et al. ................. 359/334 |
| 2002/0181074 A1 | * | 12/2002 | Seydnejad et al. ........... 359/334 |
| 2003/0021008 A1 | * | 1/2003 | Islam et al. .................. 359/334 |
| 2003/0067671 A1 | * | 4/2003 | Islam et al. .................. 359/337 |

FOREIGN PATENT DOCUMENTS

EP          0932229 A2     7/1999     ........... H01S/3/131

* cited by examiner

Primary Examiner—Thomas G. Black
Assistant Examiner—Deandra M. Hughes
(74) Attorney, Agent, or Firm—Bell, Boyd & Lloyd LLC

(57) ABSTRACT

A pumping source with a number of regulated pump lasers for broadband optical amplification of a WDM signal is provided, wherein, the powers of the pump lasers that exhibit different wavelengths are regulated such that all the channels of a WDM signal exhibit a flat profile of their levels at the end of the transmission fiber and in the event of a defect and, particularly, in the event of a failure or a partial failure of the pump lasers, the corresponding change in the gain profile is automatically compensated for by a supervisory regulation device for resetting the pumping powers in the event of a failure report, thereby resulting in a minimal change in the gain spectrum of all the channel levels of a WDM signal in the event of defective operation of the pumping source.

10 Claims, 3 Drawing Sheets

PUMPING SOURCE HAVING A PLURALITY OF REGULATED PUMP LASERS FOR BROADBAND OPTICAL AMPLIFICATION OF WDM SIGNAL

BACKGROUND OF THE INVENTION

The present invention relates to a pumping source having a number of regulated pump lasers for broadband optical amplification of a WDM (Wavelength Division Multiplex) signal.

It is known that an optical signal is attenuated when being transmitted through an optical fiber. It is, therefore, necessary to reamplify optical signals after their passage through a specific fiber link. In general, two physical criteria of the optical transmission of WDM signals are important: the gain spectrum and the optical signal-to-noise ratio (OSNR). In WDM systems, the gain spectrum or the amplification must be approximately constant for all the channels (individual signals) of the WDM signal, and the OSNR must be sufficiently large. In the ideal case, the profiles of the signal levels and of the OSNRs will be flat for all the channels. In this regard, Raman amplifiers offer clear advantages, since they amplify the signals in the transmission fiber. Further, the transmission characteristics are also decisively improved. All the channels at the end of the fiber should have at least approximately equal amplitudes. Specifically, when cascading a number of Raman amplifiers, a flat gain spectrum ensures that all the channels fall into the dynamic range of the receivers.

Consequently, in an optimal system the aim is to achieve a gain spectrum that is as flat as possible or equal output levels of the individual channels at the end of the transmission fiber section. A very flat gain spectrum over a wide wavelength range can be achieved by using a pumping source with a broadband spectrum. Previously known broadband Raman amplifiers for WDM transmission systems operate with a number of pump lasers whose output signals exhibit different wavelengths.

Pump lasers with low output powers, for example semiconductor laser diodes, are frequently provided as pumping sources. The power of the pump lasers can change in the event of aging and incalculable defects, or owing to external influences (e.g., temperature). Thus, one or more pump lasers may fail completely, thereby impairing the gain spectrum of the amplification of the WDM signal.

A method for avoiding the saturation of the pump laser signals from pump lasers (marked by LD 81, 82) is disclosed in U.S. Pat. No. 5,479,423. The saturation can be caused by aging or temperature fluctuations. According to FIG. 1 of U.S. Pat. No. 5,479,423, the laser diodes 81, 82 are driven via a control module 4 and, in each case, a laser current source (i.e., "drive circuit" 71, 72). A "feedback" signal SV impressed by modulation performs the regulation. However, a disadvantage of this method is that it offers no compensation for an optimal amplification of the transmission signal if a laser diode fails.

A device and a method for automatically controlling the total power of a number of pumping sources of an optical amplifier are disclosed in European Patent Application No. EP 0932229 A2. The goal of this method is to keep a predefined total gain constant in the event of a change in the pumping power or a failure of a pumping source. For an amplifier stage 100 (see FIG. 1 of European Patent Application No. EP 0932229 A2), the signals of a number of pumping modules 200, 300 are fed into the transmission fiber. The pumping modules 200, 300 each have a pumping source 210 and a circuit for controlling the pumping power. The output signal of the amplifier is supplied to a control module 270 of the pumping source 210 via a splitter 120 and a power detector 230, in a fashion converted into a first reference signal 234. A second reference signal 254 (error signal) is obtained from the difference between the current measured pumping power 210 and the average power of the pumping sources of the pump modules and supplied to the control module 270. Maintaining the average power of the pumping source of all the pumping modules requires a network in order to supply information concerning the output powers of each pumping source to all of the other pumping modules. A third reference signal 264 in each pumping module corresponds to the pumping power for a required gain of the amplifier stage 100. Like the two other reference signals 234, 254, the third reference signal 264 is supplied to the control module 270. The control module 270 uses the three reference signals 234, 254, 264 to determine the power being delivered by the pumping source 210. Thus, during operation, the powers of all the pumping modules are supervised as a function of a predefined gain. In the event of a failure of a pumping module, additional pumping modules are activated and their pumping powers are regulated anew so that the desired total gain of the amplifier stage 100 reaches its original value. When amplifying WDM signals, it is possible to extend the pumping modules with a number of pumping sources that exhibit different wavelengths (see column 9, paragraph 0034, lines 31-35). However, a disadvantage of this device and method is that they do not provide regulation of the pumping powers in the event of a failure or aging of one of the pumping sources in a multiwavelength pumping module. A further disadvantage is that they do not address the flattening of the gain spectrum in WDM transmissions systems. Moreover, a software module is used for regulating the pump power of one or more pump modules in addition to the failing module and not for regulating the output powers of non-failed lasers in a failing module.

SUMMARY OF THE INVENTION

An advantage of the present invention is, therefore, to provide a multiwavelength pumping source which keeps the changes in gain over the entire bandwidth of the WDM signal within a minimal tolerance range in the event of a partial failure or a complete failure of a pump laser of the pumping source.

The output powers of the pump lasers of the pumping source according to an embodiment of the present invention are supervised individually and set such that the gain is constant for the entire bandwidth of the transmitted WDM signal. An advantage of the present invention is that in the event of a failure of a pump laser (or, more rarely, of another element of the closed loop), the intact pump lasers are controlled such that the gain remains approximately constant over the entire bandwidth of the transmission signal. Accordingly, there is no need for standby lasers.

In an embodiment, depending on the type of defect, the output powers of the intact pump lasers are reset in accordance with new predefined parameters that are stored as sets in a database, for example, in the form of a table.

In an advantageous embodiment, the database can be changed by reprogramming, such that further operational failures, for example partial failures of a number of pump lasers in the event of a slow deterioration, can be compensated for.

In an embodiment, it is also possible to reconfigure the pump lasers via an external database.

An appropriate alarm signal is output, in an embodiment, in the event of defective operation in order to identify a failure and to replace the defective module.

Additional features and advantages of the present invention are described in, and will be apparent from, the following Detailed Description of the Invention and the Figures.

DETAILED DESCRIPTION OF THE INVENTION

Figure 1:
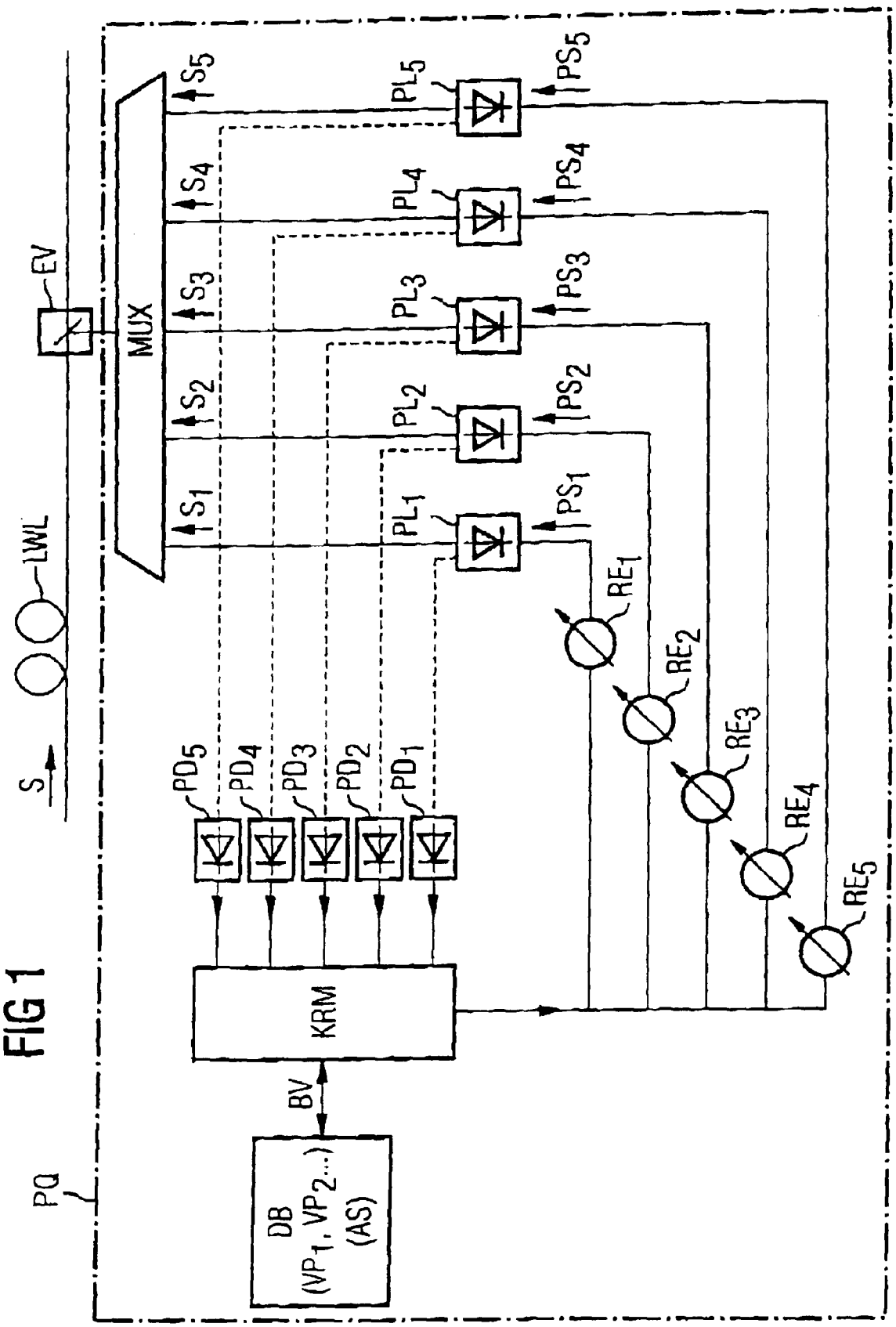
FIG. 1 shows a block diagram of a regulated pumping source having a number of pump lasers according to an embodiment of the present invention.

FIG. 1 shows a block diagram of a regulated pumping source PQ according to an embodiment of the present invention having five pump lasers $PL_1, \ldots, PL_5$ whose pumping signals $S1, \ldots, S5$ are combined by a multiplexer MUX and fed into a transmission fiber LWL by a coupling device EV. The pumping signals $S1, \ldots, S5$ can be fed in the direction of the WDM signal transmission (codirectional pumping) or opposite to the WDM signal transmission (contradirectional pumping). The channels of the WDM transmission signal S experience Raman amplification, there being a maximal gain in the event of a frequency difference (or Stokes shift) of 13.2 THz between a pumping signal and a channel of the transmission signal S. In order to measure the output power of the pump lasers $PL_1, \ldots, PL_5$ and to regulate the respective pumping powers, photodiodes $PD_1, \ldots, PD_5$ and laser current sources $RE_1, \ldots, RE_5$ that are connected to a supervisory regulation device KRM are assigned to the pump lasers $PL_1, \ldots, PL_5$. In the event of a failure of a pump laser or, generally, in the event of a defect in an element, for example, the pump lasers $PL_i$, of a closed loop $PL_i$, $PD_i$, KRM or $RE_i$, where 0<i<6, the supervisory regulation device KRM will transmit the appropriate failure information to the database DB. After identification of the failure, new predefined parameters $VP_1, VP_2 \ldots$ are selected in the database DB. These parameters $VP_1, VP_2 \ldots$ effect a reconfiguration of the pumping currents $PS_1, PS_2, PS_3, PS_5$ (here, for example, with $PS_4=0$) via the supervisory regulation device KRM and, furthermore, the laser current sources $RE_1, \ldots, RE_5$. Thus, a defect is compensated for with the aid of the predefined parameters $VP_1, VP_2 \ldots$ stored in the database DB instead of via a regulation unit that supervises the output signal at the end of the transmission link LWL.

Moreover, in an embodiment, an alarm signal AS is generated for externally signaling the failure to, for example, an operator. After replacement of the defective pump laser, the alarm signal AS is reset so that the original predefined parameters $VP_1, VP_2 \ldots$ corresponding to the acceptable operation can be used again. In the event of deviant characteristics of the newly implemented element, it may be necessary to input new predefined parameters $VP_1, VP_2, \ldots$ into the database DB. The database DB can also be extended for different failure modes such that even partial failures of one or more pump lasers $PL_i$ are compensated for by laser current sources $RE_i$, (i>0) or photodetectors $PD_i$ (i>0). When a photodiode $PD_i$ indicates the failure of a pumping signal or the power drops below a threshold at the supervisory regulation device KRM, the appropriate laser current source $RE_i$ is switched off, since various failures may be present in the control circuit KRM, $PD_i$, $PL_i$, $RE_i$.

Figure 2:
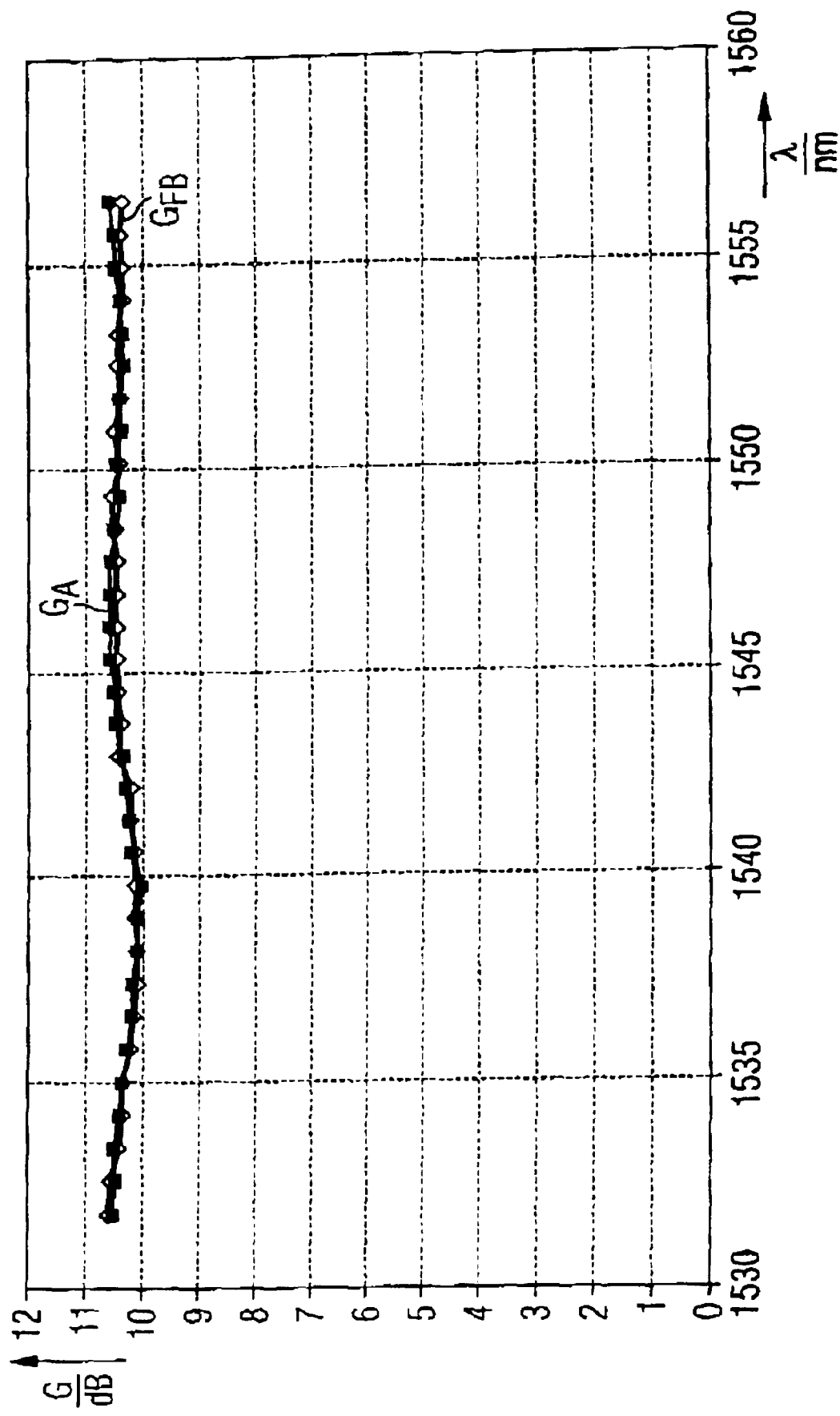
FIG. 2 shows gain profiles in a normal state and in the event of a failure of a pump laser when employing a regulated pumping source according to an embodiment of the present invention.

FIG. 2 shows the gain spectrum $G_{FB}$ for acceptable operation, and the compensated gain spectrum $G_A$ for the failure of the fourth pump laser $PL_4$ in FIG. 1 as a function of the wavelength λ. As shown in FIG. 2, upon reconfiguring the pumping currents, the difference between the two gain profiles is less than 0.5 dB.

Figure 3:
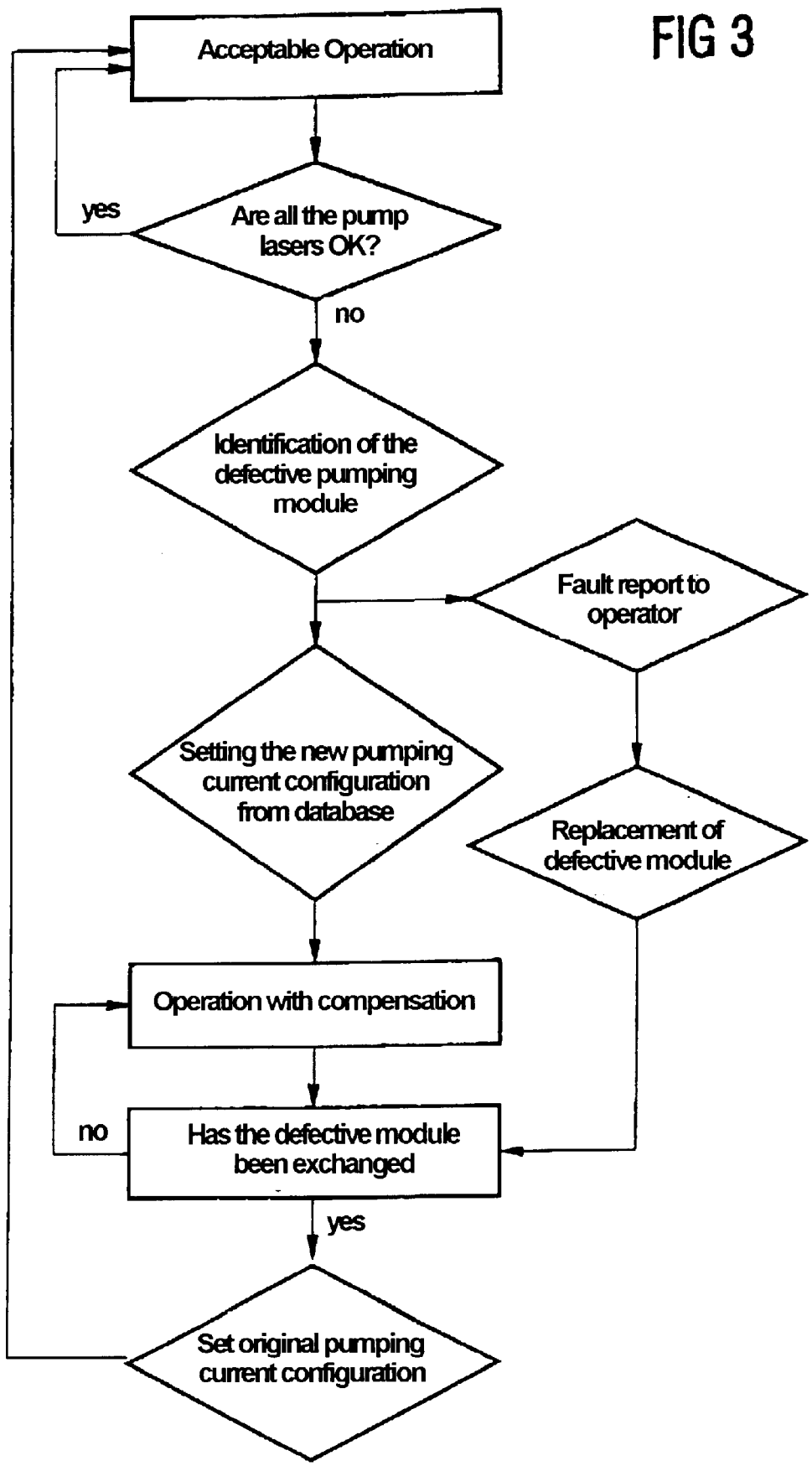
FIG. 3 shows a flowchart for supervising and resetting a pumping module according to an embodiment of the present invention.

A method according to an embodiment of the present invention for supervising a defective element, in particular of a pump laser, in the closed loops KRM, $PD_i$, $PL_i$, $RE_i$ (i>0) is explained with the aid of FIG. 3. Firstly, the functioning of all the pump lasers is checked. The defective pump laser (another defective element of the closed loop can also be involved) is identified, and then a data record is fetched from the database DB in accordance with the failure for the purpose of resetting the pumping currents of the operational pump lasers, and the pumping currents are reset. A failure report is also sent to the operator. The failure report is maintained as long as the defective element (e.g., the pump laser) is not replaced. After the replacement of the defective element, the original pumping current is reset to the original, acceptable operation.

In an embodiment, the supervision is configured in such a way that the transmission of the WDM signal is virtually undisturbed when reconfiguring the pump sources.

Although the present invention has been described with reference to specific embodiments, those of skill in the art will recognize that changes may be made thereto without departing from the spirit and scope of the invention as set forth in the hereafter appended claims.

What is claim is:

1. A pumping source for obtaining a constant broadband amplification of a wavelength division multiplex signal transmitted via an optical fiber, comprising:

a plurality of regulated pump lasers;

a database having a table which contains different sets of predefined parameters for setting output powers of the pump lasers, certain of the predefined parameters being assigned to failure of at least one of the pump lasers; and a supervisory regulation device corresponding to the database for supervising and regulating pumping signals generated by the pump lasers, wherein upon failure of at least one pump laser, the supervisory regulation device sets the output powers of non-failed pump lasers in accordance with the predefined parameters assigned to the failure such that all optical channels of the wavelength division multiplex signal maintain substantially equal levels.

2. A pumping source as claimed in claim 1, further comprising:

laser diodes as the pump lasers;

photodetectors connected to outputs of the laser diodes for supervising the pumping signals;

controllable pumping current sources connected upstream of control inputs of the laser diodes for setting pumping currents, the supervisory regulation device being connected to the photodetectors and setting the pumping currents via the controllable pumping current sources as a function of the predefined parameters;

a wavelength division multiplexer for combining the pumping signals; and a coupling device arranged at least one of a beginning and an end of a transmission fiber section via which the combined pumping signals are fed into the transmission fiber at least one of parallel to and against the transmission direction of the wavelength division multiplex signal.

3. A pumping source as claimed in claim 1, further comprising a data circuit connecting the database to the supervisory regulation device, the data circuit identifying a state of the pumping signals and outputting the predefined parameters to the supervisory regulation device in accordance with the identified state.

4. A pumping source as claimed in claim 1, wherein the database is arranged at least one of internally and externally, and wherein the predefined parameters are at least one of internally and externally resettable.

5. A pumping source as claimed in claim 1, wherein an alarm signal is output for identifying and for externally signaling at least a partial failure of a pumping signal.

6. A pumping source as claimed in claim 1, wherein a pumping signal is switched off upon a partial failure of the pumping signal.

7. A pumping source as claimed in claim 1, wherein the table contains further sets of predefined parameters for reconfiguration upon at least a partial failure of a plurality of the pumping signals.

8. A method for obtaining a constant broadband optical amplification of a wavelength division multiplex signal by feeding in a plurality of pumping signals from regulated pump lasers, the method comprising the steps of:

selectively supervising the pumping signals using photodetectors and a supervisory regulation device;

fetching a set of a plurality of predefined parameters from a database for reconfiguration of the pumping signals upon at least a partial failure of at least one of the pumping signals; and setting powers of the pumping signals of non-failed pump lasers such that a profile of broadband amplification maintains a substantially constant level.

9. A method as claimed in claim 8, further comprising the steps of:

outputting an alarm signal upon at least a partial failure of at least one of the pump lasers; and identifying at least one of a defective pump laser and another defective element of a closed loop using information provided by the alarm signal.

10. A method as claimed in claim 8, further comprising the steps of:

replacing at least one of a defective pump laser and further elements in the closed loop of the pump laser; and resetting the predefined parameters in the database that correspond to different properties of at least one of the replaced pump laser and the replaced further elements in the closed loop of the pump laser.

* * * * *